US011794257B2

(12) United States Patent
Kinoshita et al.

(10) Patent No.: US 11,794,257 B2
(45) Date of Patent: Oct. 24, 2023

(54) CUTTING INSERT AND CUTTING TOOL

(71) Applicant: KYOCERA CORPORATION, Kyoto (JP)

(72) Inventors: Hideyoshi Kinoshita, Satsumasendai (JP); Ryoma Nomiyama, Satsumasendai (JP); Kaoru Iwata, Okazaki (JP)

(73) Assignee: KYOCERA Corporation, Kyoto (JP)

( * ) Notice: Subject to any disclaimer, the term of this patent is extended or adjusted under 35 U.S.C. 154(b) by 408 days.

(21) Appl. No.: 16/093,154

(22) PCT Filed: Apr. 13, 2017

(86) PCT No.: PCT/JP2017/015145
§ 371 (c)(1),
(2) Date: Oct. 12, 2018

(87) PCT Pub. No.: WO2017/179657
PCT Pub. Date: Oct. 19, 2017

(65) Prior Publication Data

US 2019/0176240 A1 Jun. 13, 2019

(30) Foreign Application Priority Data

Apr. 13, 2016 (JP) ................................ 2016-080387

(51) Int. Cl.
*B23B 27/14* (2006.01)
*C22C 29/04* (2006.01)

(52) U.S. Cl.
CPC ............ *B23B 27/145* (2013.01); *B23B 27/14* (2013.01); *B23B 27/148* (2013.01); *C22C 29/04* (2013.01);
(Continued)

(58) Field of Classification Search
CPC ... B23B 27/141; B23B 27/145; B23B 27/148; B23B 2224/32; B23B 27/14–20; B23B 27/00–24
See application file for complete search history.

(56) References Cited

U.S. PATENT DOCUMENTS 5,372,873 A * 12/1994 Yoshimura ............ C23C 30/005 428/216
8,137,795 B2 * 3/2012 Omori .................. B23B 27/141 51/307
(Continued)

FOREIGN PATENT DOCUMENTS

JP S6431949 A 2/1989
JP 2011088239 A 5/2011
(Continued)

OTHER PUBLICATIONS

Hosseini et al, "Surface Integrity of Hard Turned Surfaces on AISI 52100". Proceedings of the 12th euspen International Conference—Stockholm—Jun. 2012. (Year: 2012).*

*Primary Examiner* — Keith Walker
*Assistant Examiner* — Benjamin C Anderson
(74) *Attorney, Agent, or Firm* — VIERING, JENTSCHURA & PARTNER MBB

(57) ABSTRACT

A cutting insert may include a base member. The base member may include a first surface, a second surface adjacent to the first surface, and a first cutting edge located in at least a part of a first ridge line which the first surface intersects with the second surface. The base member may include a hard phase containing a titanium carbonitride, and a binding phase containing at least one of cobalt and nickel. The hard phase may include a first hard phase observed on a higher angle side, and a second hard phase observed on a lower angle side in a comparison of (422) plane peak in an X-ray diffraction analysis. A compressive residual stress of
(Continued)

2(1)

13 14 11 16 15 12 the second hard phase in the second surface may be less than a compressive residual stress of the second hard phase in the first surface.

20 Claims, 6 Drawing Sheets

(52) U.S. Cl.
CPC ..... *B23B 2200/049* (2013.01); *B23B 2224/32* (2013.01)

(56) References Cited

U.S. PATENT DOCUMENTS

| | | | | |
|---|---|---|---|---|
| 10,094,005 | B2 * | 10/2018 | Nomiyama | C22C 29/067 |
| 2007/0092761 | A1 * | 4/2007 | Ohata | C23C 14/548 428/698 |
| 2007/0253787 | A1 * | 11/2007 | Ishii | B23B 27/141 407/113 |
| 2009/0223333 | A1 * | 9/2009 | Tanibuchi | C23C 16/44 83/13 |
| 2010/0014930 | A1 * | 1/2010 | Taniuchi | C22C 27/04 407/66 |
| 2011/0129312 | A1 * | 6/2011 | Kinoshita | C22C 29/10 407/119 |
| 2014/0227053 | A1 * | 8/2014 | Tokunaga | C22C 29/02 407/119 |
| 2015/0299051 | A1 * | 10/2015 | Kinoshita | C22C 29/04 144/229 |
| 2016/0369380 | A1 | 12/2016 | Kinoshita | |

FOREIGN PATENT DOCUMENTS

| | | | | |
|---|---|---|---|---|
| WO | WO-2014084389 | A1 * | 6/2014 | B23C 5/14 |
| WO | WO-2014208447 | A1 * | 12/2014 | C22C 29/005 |

* cited by examiner 5
1
107
103
101
105

CUTTING INSERT AND CUTTING TOOL

CROSS-REFERENCE TO RELATED APPLICATIONS

This application is a national stage entry according to 35 U.S.C. 371 of PCT Application No. PCT/JP2017/015145 filed on Apr. 13, 2017, which claims priority to Japanese Application No. 2016-080387 filed on Apr. 13, 2016, which are entirely incorporated herein by reference.

TECHNICAL FIELD

The present disclosure relates to a cutting insert usable in a cutting process.

BACKGROUND

As a material of cutting inserts usable for cutting tools, cermet composed mainly of titanium is widely used at present. For example, Japanese Unexamined Patent Publication No. 1-31949 (Patent Document 1) discusses a cutting insert composed of cermet in which a compressive stress (hereinafter also referred to as "compressive residual stress") remains in a hard phase located in a surface due to shot peening method. Japanese Unexamined Patent Publication No. 2011-088239 (Patent Document 2) discusses a cutting insert composed of cermet in which a compressive stress remains in a hard phase located in a surface due to a wet blast process.

SUMMARY

A cutting insert may include a base member. The base member may include a first surface, a second surface adjacent to the first surface, and a first cutting edge located in at least a part of a first ridge line which the first surface intersects with the second surface. The base member may include a hard phase containing a titanium carbonitride, and a binding phase containing at least one of cobalt and nickel. The hard phase may include a first hard phase observed on a higher angle side, and a second hard phase observed on a lower angle side in a comparison of (422) plane peak in an X-ray diffraction analysis. A compressive residual stress of the second hard phase in the second surface is less than a compressive residual stress of the second hard phase in the first surface.

DETAILED DESCRIPTION

In recent years there has been a demand for a cutting insert whose cutting edge is excellent in fracture resistance and wear resistance.

A cutting insert 1 in a non-limiting aspect of the disclosure is described below with reference to FIGS. 1 to 5.

The cutting insert 1 (hereinafter referred to simply as "insert 1") illustrated in FIGS. 1 and 2 includes a base member 2 having a polygonal plate shape. When the base member 2 is not covered with a coating layer (not illustrated), the base member 2 itself is the insert 1. The insert 1 may be composed only of the base member 2, or alternatively may be composed of the base member 2 and the coating layer that covers the base member 2.

Figure 1:
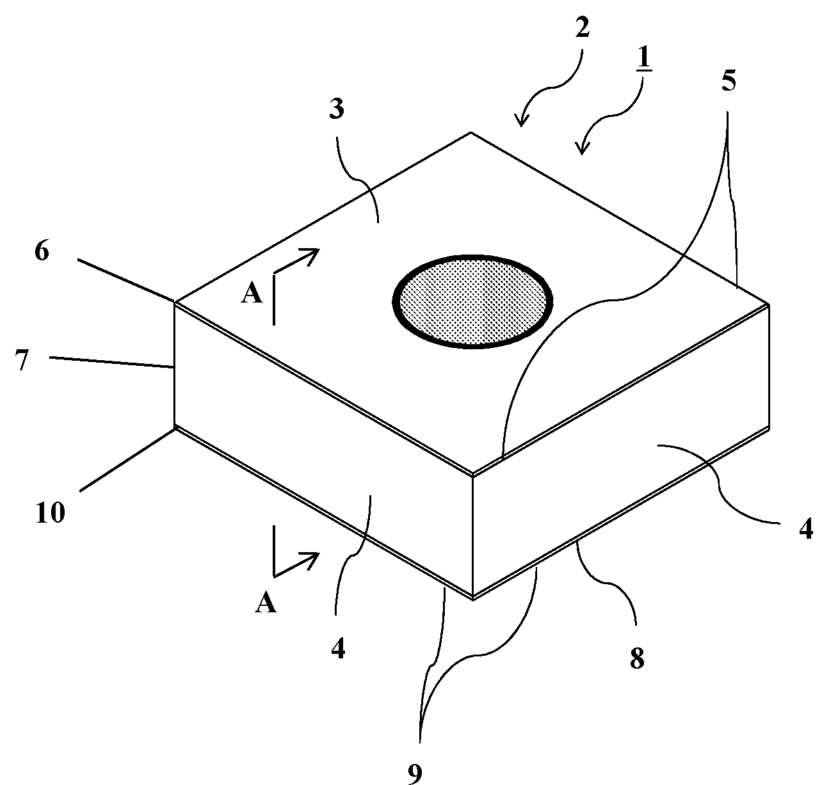
FIG. 1 is a perspective view illustrating a cutting insert.

As illustrated in FIG. 1, the base member 2 includes a first surface 3, a second surface 4 adjacent to the first surface 3, and a first cutting edge 5 located in at least a part of a first ridge line which the first surface 3 intersects with the second surface 4. At least a part of the first surface 3 serves as a rake surface region. At least a part of the second surface 4 serves as a flank surface region.

Figure 3:
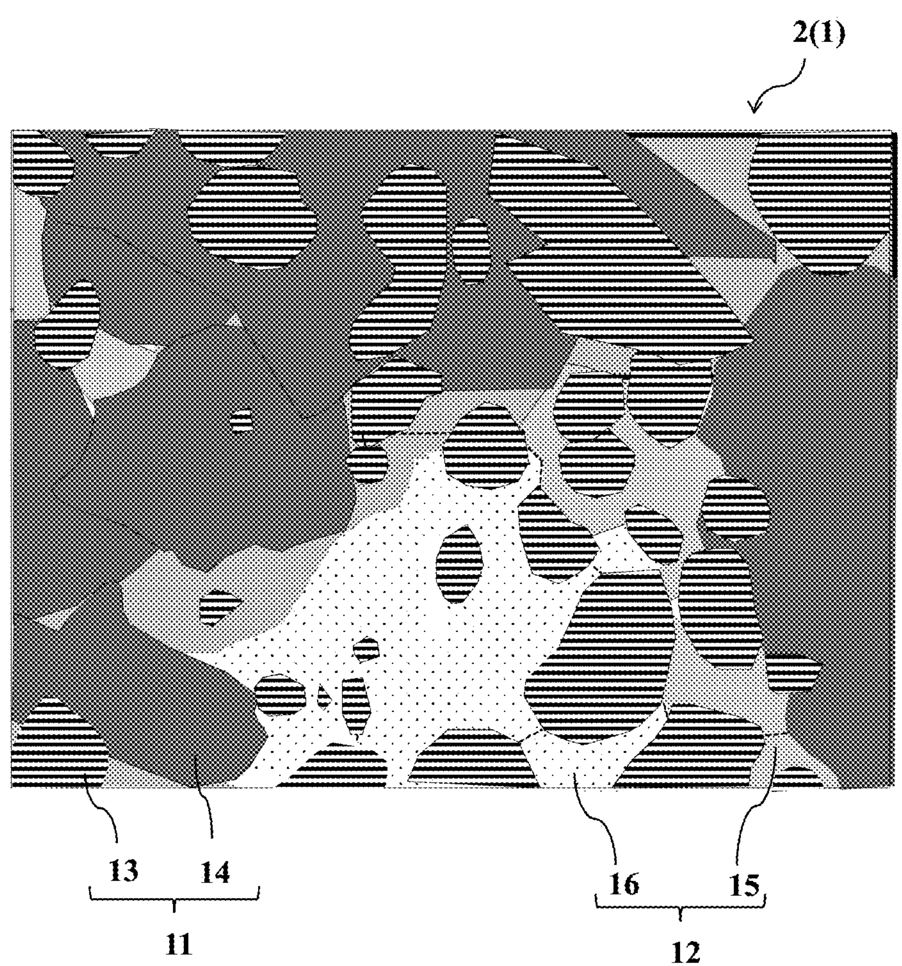
FIG. 3 is a schematic diagram of a structure of cermet constituting the cutting insert in FIG. 1.
Figure 4:
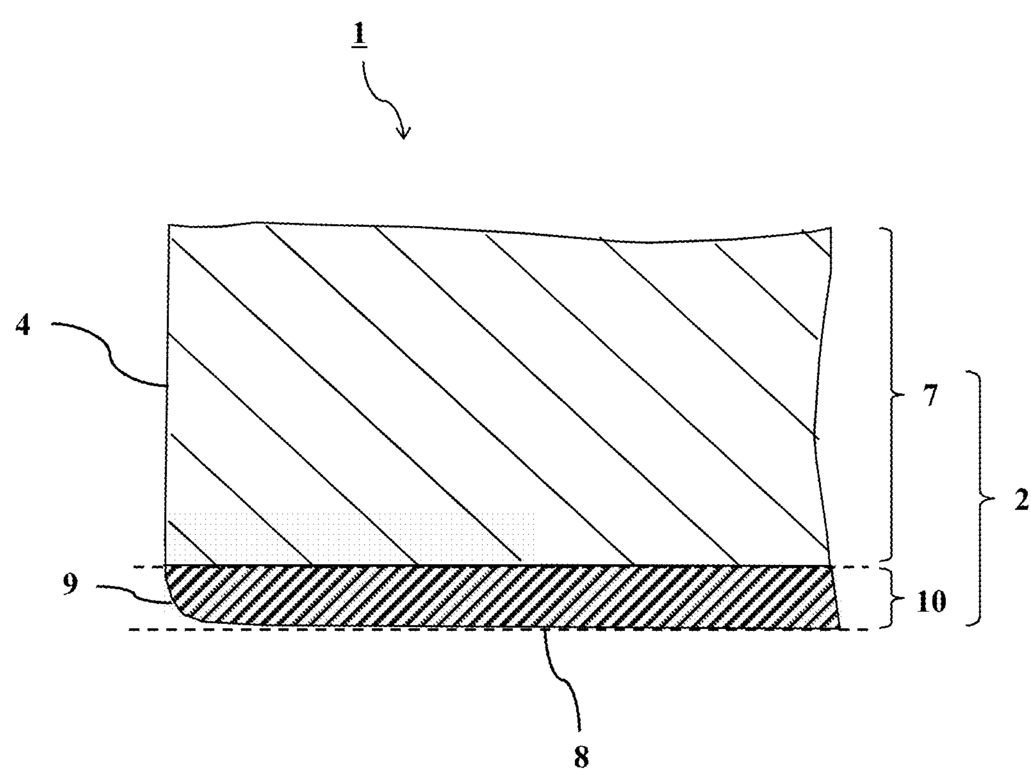
FIG. 4 is a schematic diagram illustrating a state in which a cutting edge in the cutting insert in FIG. 1 is observed.

As illustrated in FIG. 3, the base member 2 includes a hard phase 11 containing titanium (Ti) carbonitride, and a binding phase 12 containing at least one of cobalt (Co) and nickel (Ni). For example, cermet is usable for the base member 2.

The hard phase 11 includes a first hard phase 13 and a second hard phase 14 as two kinds of phases that are different in composition. When the two phases are compared in terms of (422) plane peak by performing an X-ray diffraction analysis of the hard phase 11, the two phases are different in peak value. The first hard phase 13 is observed on a higher angle side, and the second hard phase 14 is observed on a lower angle side in the present non-limiting aspect of the disclosure in the comparison of (422) plane peak in the X-ray diffraction analysis.

A compressive residual stress of the first hard phase 13 is greater than a compressive residual stress of the second hard phase 14 because the (422) plane peak in the first hard phase 13 is observed on the higher angle side than the (422) plane peak in the second hard phase 14 in the insert 1 of the present non-limiting aspect of the disclosure.

A compressive residual stress of the second hard phase 14 in the second surface 4 is less than a compressive residual stress of the second hard phase 14 in the first surface 3 in the insert 1 of the present non-limiting aspect of the disclosure. By having the above configuration, the second hard phase 14 in the flank surface region of the second surface 4 tends to degranulate, and the first cutting edge 5 can therefore be easily made sharp, thus leading to enhanced cutting performance. Additionally, because the second hard phase 14 in the flank surface region tends to degranulate, it becomes easy to fit a shape of a workpiece. It is therefore possible to obtain a smoother finished surface during a cutting process.

The second hard phase 14 is less likely to degranulate and less susceptible to wear, such as crater wear, in the rake surface region of the first surface 3. This leads to enhanced wear resistance of the first surface 3 including the rake surface region.

Also, when a compressive residual stress of the first hard phase 13 in the second surface 4 is greater than a compressive residual stress of the first hard phase 13 in the first surface 3, the wear resistance of the first surface 3 can be further enhanced and the first cutting edge 5 can therefore be more easily made sharp. The reason for this is as follows. It is easy to increase the compressive residual stress of the second hard phase 14 in the first surface 3 when the compressive residual stress of the first hard phase 13 in the first surface 3 is relatively small. It is also easy to decrease the compressive residual stress of the second hard phase 14 in the second surface 4 when the compressive residual stress of the first hard phase 13 in the second surface 4 is relatively great.

The compressive residual stress of the second hard phase 14 in each of the first surface 3 and the second surface 4 need not be limited to a specific value. However, the compressive residual stress of the second hard phase 14 in the second surface 4 need to be less than the compressive residual stress of the second hard phase 14 in the first surface 3.

In particular, when the compressive residual stress of the second hard phase 14 in the second surface 4 is 10-400 MPa, the first cutting edge 5 can be made sharper, thus leading to further enhanced cutting performance. When the compressive residual stress of the second hard phase 14 in the first surface 3 is 450-1000 MPa, the second hard phase 14 in the rake surface region is much less likely to degranulate, thereby further enhancing the wear resistance of the first surface 3.

The base member 2 illustrated in FIG. 1 is a quadrangular plate shaped body, and each of the first surface 3 and the second surface 4 has a quadrangular shape. The shape of the base member 2 is, however, not limited to this configuration. For example, there is no problem even if the first surface 3 has a triangular shape and the base member 2 is a triangular plate shaped body. Alternatively, there is no problem even if the first surface 3 has a circular shape and the base member 2 is a circular plate shaped body.

The first cutting edge 5 is located in at least a part of a first ridge line which the first surface 3 intersects with the second surface 4. Here, the first cutting edge 5 may be located over the entirety of the first ridge line which the first surface 3 intersects with the second surface 4. Alternatively, the first cutting edge 5 may be located only in a part of the first ridge line which the first surface 3 intersects with the second surface 4.

The base member 2 in the present non-limiting aspect of the disclosure includes a plurality of hard phases 11 and a plurality of binding phases 12. Each of the hard phases 11 is composed of a plurality of first hard phases 13 and a plurality of second hard phases 14. The first hard phases 3, the second hard phases 14, and the binding phases 12, all of which constitute the base member 2, are distinguishable by checking a distribution state and a content ratio of each element by an Electron Probe Micro Analyzer (EPMA) or Auger analysis. Particle diameters of the first hard phases 13 and the second hard phases 14 need to be measured in accordance with a method of measuring a mean particle diameter of cemented carbide, which is defined by CIS-019D-2005.

The hard phases 11 contain titanium carbonitride (TiCN). Each of the first hard phases 13 and the second hard phases 14 may contain only titanium carbonitride, or alternatively may contain, besides titanium, one or more kinds selected from metals of Groups 4, 5, and 6 of the periodic table. For example, the first hard phases 13 may be composed of a TiCN phase, and the second hard phases 14 may be composed of a phase of composite titanium carbonitride and one or more kinds selected from metals of Groups 4, 5, and 6 of the periodic table.

The first hard phases 13 and the second hard phases 14 are, for example, arranged so that the first hard phases 13 are located as a core part and the second hard phases 14 are located as a circumferential part and surround the core part.

In terms of (422) plane peak in the X-ray diffraction analysis, a value of 219 appears between 135-140 degrees. A peak p2(422) that appears on the lower angle side in the above angle range is a peak belonging to the second hard phase 14, and a peak $p_1$(422) that appears on the higher angle side is a peak belonging to the first hard phase 13.

In order to achieve high accuracy in the X-ray diffraction analysis, a measuring position corresponds to a position in the base member 2 which is separated 1 mm or more from the cutting edge. The X-ray diffraction analysis needs to be carried out, for example, by irradiating CuKα ray as an X-ray source to the first surface 3 and the second surface 4 after being subjected to mirror finishing, under conditions of output of 45 kV and 110 mA.

A residual stress of the hard phase 11 can be measured by performing the X-ray diffraction analysis. The residual stress in the hard phase 11 needs to be calculated by using 0.20 as Poisson's ratio of titanium nitride and 423729 MPa as Young's modulus.

The hard phase 11 mainly includes the first hard phases 13 and the second hard phases 14. Therefore, the hard phase 11 may include, besides the first hard phases 13 and the second hard phases 14, a phase composed of, for example, a carbide or nitride of one or more kinds selected from metals of Groups 4, 5, and 6 of the periodic table, except for titanium. An area ratio of the first hard phases 13 and the second hard phases 14 in an entire area of the hard phases 11 may be 90% by area or more in an observation through a microscope in a non-limiting aspect of the disclosure.

As a size of each of the first hard phases 13 constituting the hard phases 11, a mean particle diameter d1 thereof is settable to, for example, 0.05-0.5 μm. As a size of each of the second hard phases 14 constituting the hard phases 11, a mean particle diameter d2 thereof is settable to, for example, 0.5-2 μm.

However, the size of each of the first hard phases 13 and the size of each of the second hard phases 14 are not limited to the above-mentioned values. When a particle diameter ratio (d2/d1) is 3-10, a maximum height of each of the first surface 3 and the second surface 4 is easily controllable within a predetermined range. When the particle diameter falls within the above range, it is easy to reduce degranulation of the first hard phases 13 and the second hard phases 14.

The binding phases 12 contain at least one of cobalt and nickel. In other words, the binding phases 12 may contain only one of cobalt and nickel, or may contain both of cobalt and nickel.

The binding phases 12 may also contain tungsten (W) in addition to cobalt and nickel. Here, the binding phases 12 may include a first binding phase 15 and a second binding phase 16 as two kinds of phases that differ in mass ratio of tungsten. As an example, the binding phases 12 may contain a first binding phase 15 whose mass ratio of tungsten to a total amount of cobalt and nickel (W/(Co+Ni)) is 0.8 or less, and a second binding phase 16 whose W/(Co+Ni) is 1.2 or more.

The first binding phase 15 and the second binding phase 16 are distinguishable, for example, by observing the base member 2 through a microscope, and by checking a distribution of each metal element with the Electron Probe Micro Analyzer (EPMA), as well as on the basis of results of ratios of metal elements at each position.

Heat dissipation of the base member 2 can be enhanced when the binding phases 12 include the first binding phase 15 and the second binding phase 16. A temperature of the first cutting edge 5 is therefore less likely to increase during a cutting process, thus leading to improved wear resistance of the first cutting edge 5.

When the binding phases 12 include the second binding phase 16 whose mass ratio of tungsten is relatively great, because of relatively high elasticity, the binding phase 16 tends to absorb impact by being elastically deformed when impact is exerted on the insert 1. This makes it possible to enhance the fracture resistance of the base member 2, and chipping is less likely to occur in the first cutting edge 5 during the cutting process.

When the binding phases 12 include the first binding phase 15 whose mass ratio of tungsten is relatively small, it is possible to enhance wettability between the binding phases 12 and each of the first hard phases 13 and the second hard phases 14. A crack is less likely to advance into the base member 2, thus leading to enhanced fracture resistance of the insert 1.

When the binding phases 12 include the first binding phase 15 and the second binding phase 16, it is easy to manufacture the base member 2 in which a compressive residual stress of the second hard phases 14 in the first surface 3 is 450-1000 MPa and a compressive residual stress of the second hard phases 14 in the second surface 4 is 10-400 MPa.

The binding phases 12 mainly include the first binding phase 15 and the second binding phase 16. Although not particularly illustrated in FIG. 3, the binding phases 12 may include a phase other than the first binding phase 15 and the second binding phase 16, for example, a third binding phase in which W/(Co+Ni) is greater than 0.8 and less than 1.2 ($0.8<W/(Co+Ni)<1.2$). An area ratio of the first binding phase 15 and the second binding phase 16 in an entire area of the binding phases 12 may be 90% by area or more on the basis of an observation through a microscope in a non-limiting aspect of the disclosure.

When the third binding phase is located at a coupling part between the first binding phase 15 and the second binding phase 16, a crack due to a difference in thermal expansion between the first binding phase 15 and the second binding phase 16 is less likely to occur therebetween. When the third binding phase is in contact with the first hard phases 13 and the second hard phases 14, it is possible to enhance joinability of the hard phases 11 and the binding phases 12.

Contents of metal elements to a total amount of metals (except for carbon and nitrogen) contained in the base member 2 are, for example, settable as follows: Ti is 30-55% by mass; W is 10-30% by mass; niobium (Nb) is 0-20% by mass; molybdenum (Mo) is 0-10% by mass; tantalum (Ta) is 0-10% by mass; vanadium (V) is 0-5% by mass; zirconium (Zr) is 0-5% by mass; Co is 5-25% by mass; and Ni is 0-15% by mass. When the content of each of the metal elements contained in the base member 2 falls within the above range, it is possible to enhance the wear resistance and fracture resistance of the base member 2.

A content of each of carbon and nitrogen contained in the base member 2 is settable as follows. For example, a content ratio in terms of mass of nitrogen to a total amount of carbon and nitrogen contents (N/(C+N)) is settable to 0.45-0.55. When the (N/(C+N)) falls within the above range, it is possible to enhance both the wear resistance and fracture resistance of the base member 2, and chipping is less likely to occur in the first cutting edge 5 during a cutting process. As a specific amount of each of carbon and nitrogen contained in the base member 2, for example, a carbon content in the base member 2 is settable to 6-6.5% by mass, and a nitrogen content in the base member 2 is settable to 6.5-7.4% by mass.

When evaluating the carbon and nitrogen contents in the base member 2, it is necessary to take out a portion of the base member 2 which is located at a depth of 500 μm or more from the surface. A content ratio of carbon and nitrogen can be evaluated by bringing cermet in this portion into powder, and by means of the EPMA or Auger analysis.

A ratio of each of the first hard phases 13, the second hard phases 14, the first binding phase 15, and the second binding phase 16, all of which constitute the base member 2, is not limited to a specific value. For example, an area ratio of the hard phases 11 is settable to 65-95% by area, and an area ratio of the binding phases 12 is settable to 5-35% by area with respect to an area ratio of each phase in the base member 2 to an entire field of view. The area ratio is calculable from, for example, photographs of observation results of the base member 2 through the microscope by using a well-known image analysis method. Particularly, when the area ratio of the hard phases 11 is 65-85% by area and the area ratio of the binding phases 12 is 15-35% by area, it is possible to enhance the durability of the base member 2.

When an area ratio S1 of the first hard phases 13 is 20-35% by area in terms of area ratio to the entire field of view, and an area ratio S2 of the second hard phases 14 is 35-50% by area in terms of area ratio to the entire field of view in the observation through the microscope, the fracture resistance of the base member 2 can be enhanced while maintaining the wear resistance of the base member 2.

The area ratio of each of the first binding phase 15 and the second binding phase 16 in the observation through the microscope is settable as follows. As an example, the area ratio B1 of the first binding phase 15 is settable to 15-22% by area in terms of area ratio with respect to the entire field of view, and the area ratio B2 of the second binding phase 16 is settable to 2-20% by area in terms of area ratio with respect to the entire field of view.

Specifically, when a ratio of the area ratio B2 to the area ratio B1 (B2/B1) is 0.1-2, it is possible to enhance both the wear resistance and fracture resistance of the base member 2. Particularly, when B2/B1 is 0.3-1.5, it is possible to further enhance the wear resistance and fracture resistance of the base member 2.

The base member 2 in the present non-limiting aspect of the disclosure includes a first region 6 including the first surface 3, and a second region 7 located further away from the first surface 3 than the first region 6. For example, in the configuration of FIG. 2, the second region 7 constitutes a base in the base member 2, and the layer-shaped first region 6 is located on the second region 7 so as to include the first surface 3. The first region 6 having a thickness is of 20-100 μm is highly effective in suppressing development of crater wear.

The crater wear is much less likely to occur in the first surface 3 when a content ratio of the binding phases 12 in the first region 6 is less than a content ratio of the binding phases 12 in the second region 7. This is because a content ratio of the hard phases 11 in the first region 6 can be enhanced because of a relatively small content ratio of the binding phases 12 in the first region 6 including the first surface 3.

Figure 2:
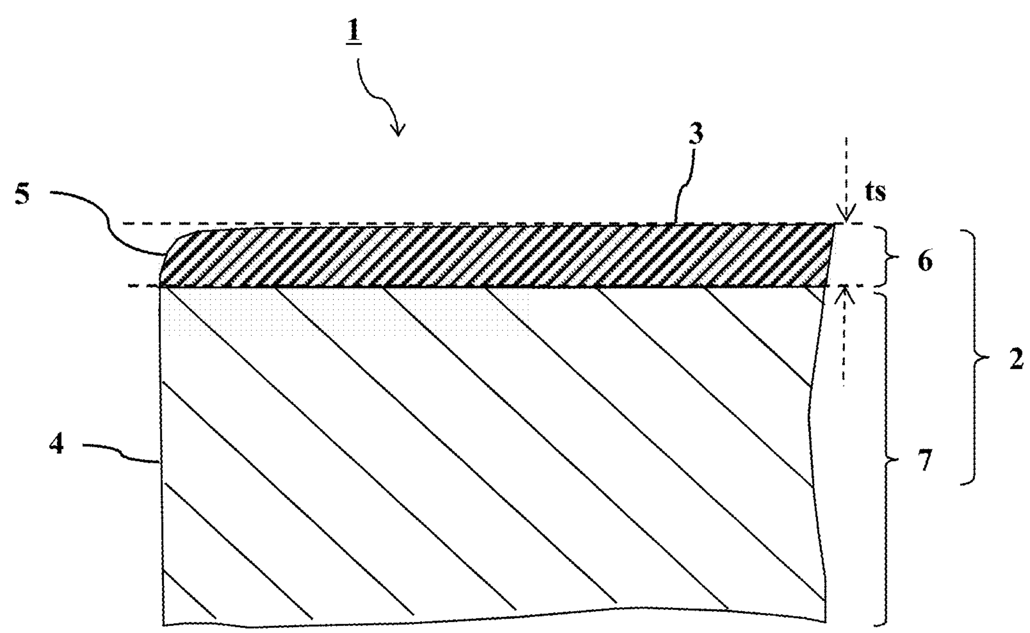
FIG. 2 is an enlarged view illustrating in enlarged dimension a part of a cross section taken along line A-A in the cutting insert in FIG. 1.

The second surface 4 contains, at least in part, the second region 7 because the first region 6 is located on the second region 7 in the base member 2 illustrated in FIG. 2. When a content ratio of the binding phases 12 of the second region 7 in the second surface 4 is less than a content ratio of the binding phases 12 in a position in the second region 7 which is located at a depth of 500 μm or more from the second surface 4, the first cutting edge 5 can be easily made sharp while enhancing the durability of the base member 2.

The reason for this is as follows. The durability of the base member 2 is enhanced because the content ratio of the binding phase 12 in the second region 7 is relatively higher than the content ratio of the binding phases 12 in the first region 6. At the same time, the second hard phases 14 in the flank surface region tend to degranulate because the content ratio of the binding phases 12 of the second region 7 in the second surface 4 is less than that at a position in the second region 7 which is located at a depth of 500 μm or more from the second surface 4.

The compressive residual stress of the second hard phases 14 in the second surface 4 is less than the compressive residual stress of the second hard phase 14 in the first surface 3 in the insert 1 of the present non-limiting aspect of the disclosure. When a compressive residual stress of the second hard phases 14 in the second region 7 is less than a compressive residual stress of the second hard phases 14 in the first region 6, the wear resistance of the first surface 3 can be maintained high, and the first cutting edge 5 can be stably easily made sharp even when the cutting process is carried out for a long period of time.

In cases where not only the second hard phases 14 located in the first surface 3 but also those located in the first region 6 have a relatively great compressive residual stress, it is possible to stably suppress development of crater wear by the entirety of the first region 6 even when a part of the second hard phases 14 located in the first surface 3 degranulates due to the cutting process over a long period of time.

In cases where not only the second hard phases 14 located in the second surface 4 but also those located in the second region 7 have a relatively small compressive residual stress, even when a part of the second hard phases 14 located in the second surface 4 degranulates due to the cutting process over a long period of time, the degranulation causes further degranulation of other second hard phases 14 that are exposed to the second surface 4 by the degranulation. Consequently, the first cutting edge 5 can be stably easily made sharp.

Although the first ridge line which the first cutting edge 5 is located has macroscopically a line shape, the first ridge line need not be strictly the line shape. The first ridge line which the first surface 3 intersects with the second surface 4 may microscopically have a curved surface shape by a so-called chamfering or honing process. When the first ridge line has the curved surface shape, the first cutting edge 5 is less likely to fracture, thus leading to enhanced durability of the first cutting edge 5.

When the first ridge line has the curved surface shape, the first surface 3 and the second surface 4 may connect to each other through a convex curve in a cross section which is orthogonal to the first surface 3 and the second surface 4 and intersects with the first cutting edge 5. Here, when a thickness of the first region 6 in a direction orthogonal to the first surface 3 in a part along the first cutting edge 5 is less than a thickness of the first region 6 in a direction orthogonal to the first surface 3 in a middle part of the first surface 3, the first cutting edge 5 indicated by the convex curve is located within the range of the first region 6. It is therefore possible to enhance the wear resistance of the first cutting edge 5.

It is also easy to decrease a radius of curvature of the convex curve when the thickness of the first region 6 in the direction orthogonal to the first surface 3 in the part along the first cutting edge 5 is relatively small as described above. Specifically, because a radius of curvature of the first cutting edge 5 is small and the first cutting edge 5 can be made into a sharp cutting edge, the shape of the first cutting edge 5 can be made more quickly into a shape that fits a processing surface, and surface roughness of the processing surface can be made more smoother. Moreover, irregularities of the first ridge line including the cutting edge 5 can be easily controlled within a predetermined range by making the first cutting edge 5 into a sharp cutting edge.

The radius of curvature of the first cutting edge 5 in the above cross section is settable to, for example, 1-10 μm. The radius of curvature of the first cutting edge 5 can be evaluated by cutting out the base member 2 and by observing a cutting edge in an obtained cross section. Alternatively, the radius of curvature of the first cutting edge 5 may be measured without cutting the base member 2 by using a contact-type surface roughness measuring instrument using a probe, a non-contact type surface roughness measuring instrument using laser, or a three-dimensional shape measuring instrument.

A maximum height of the first surface 3 is settable to, for example, 0.3-1.5 μm. A maximum height of the second surface 4 is settable to, for example, 0.2-1 μm. A maximum height of the first ridge line in a front view of the second surface 4 is settable to, for example, 1.5-6 μm.

When the maximum heights of the first surface 3, the second surface 4, and the first ridge line respectively fall within the above ranges, irregularities of a part of the first ridge line which serves as the first cutting edge 5 can be evened out immediately after starting a cutting process of a workpiece, and the first cutting edge 5 tends to have a shape that fits a processing surface of the workpiece. Consequently, a smooth machined surface can be formed immediately after starting the cutting process. It becomes easier to form the smooth machined surface when the maximum height of the first surface 3 is 0.4-1.3 μm, the maximum height of the second surface 4 is 0.3-0.5 μm, and the maximum height of the first ridge line in the front view of the second surface 4 is 2.5-5 μm.

Figure 5:
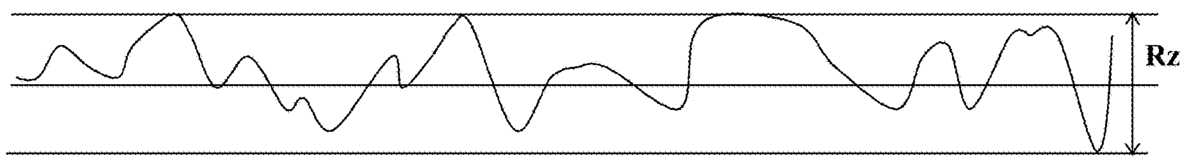
FIG. 5 is an enlarged view illustrating in enlarged dimension another part of the cross section taken along line A-A in the cutting insert in FIG. 1.

A maximum height (Rz) of the first ridge line is obtainable by measuring a portion of the first ridge line observable in a direction in which the second surface 4 corresponds to a front in the present non-limiting aspect of the disclosure. FIG. 5 is a schematic diagram illustrating a non-limiting aspect of the disclosure of a surface texture in the insert 1. A difference between a highest portion of a mountain and a deepest portion of a valley is the maximum height (Rz). The measurement needs to be carried out in accordance with standard from JISB0601-2001, except that a cut-off value is fixed to 0.08 mm. The measurement may be carried out using, for example, the contact-type surface roughness measuring instrument or the non-contact type surface roughness measuring instrument as described above.

When an arithmetic mean roughness (Ra) of the first surface 3 is 0.03-0.1 μm, chips are less likely to be welded and the machined surface is less likely to be darkened. When an arithmetic mean roughness (Ra) of the second surface 4 is 0.07-0.2 μm, a maximum height in the first cutting edge 5 can be 2-30 times a maximum height in the second surface 4. The arithmetic average roughness (Ra) of each of the first surface 3 and the second surface 4 needs to be measured in accordance with standard from JISB0601-2001, except that a cut-off value is fixed to 0.08 mm. The measurement may be carried out using, for example, the above instrument.

When the second surface 4 has micro groves, such as polishing marks extending in a direction parallel to the first cutting edge 5, it is easy to perform control so that the irregularities of the first ridge line in the direction in which the second surface corresponds to the front fall within a predetermined range. This makes it possible to further smoothen the surface roughness of the machined surface.

The maximum height in the second surface 4 is may be adjusted by a grinding process. Although the first surface 3 may be a sintered surface, it becomes easier to adjust the maximum height of the first ridge line to a predetermined range by polishing the first surface 3 by means of a brushing process or blasting process.

The base member 2 in the present non-limiting aspect of the disclosure further includes a third surface 8 and a second cutting edge 9 in addition to the first surface 3, the second surface 4, and the first cutting edge 5. The third surface 8 is located opposite the first surface 3 and adjacent to the second surface 4. Specifically, the second surface 4 in the present non-limiting aspect of the disclosure is located between the first surface 3 and the third surface 8, and connects to each of the first surface 3 and the third surface 8.

The second cutting edge 9 is located in at least a part of a second ridge line which the second surface 4 intersects with the third surface 8. Here, the second cutting edge 9 may be located over the entirety of the second ridge line which the second surface 4 intersects with the third surface 8. Alternatively, the second cutting edge 9 may be located only in a part of the second ridge line which the second surface 4 intersects with the third surface 8. In general, the first surface 3 is called an upper surface, the second surface 4 is called a side surface, the third surface 8 is called a lower surface, the first cutting edge 5 is called an upper cutting edge, and the second cutting edge 9 is called a lower cutting edge.

One of the first cutting edge 5 and the second cutting edge 9 is usually used for a single process, and when deterioration occurs with use for a long period of time, the other is usable by turning over the insert 1.

The base member 2 in the present non-limiting aspect of the disclosure includes a third region 10 including the third surface 8, in addition to the first region 6 and the second region 7. For example, in the configuration in FIG. 4, the second region 7 constitutes the base in the base member 2, and the layer-shaped third region 10 is located below the second region 7 so as to include the third surface 8.

Crater wear is much less likely to occur in the third surface 8 when a content ratio of the binding phases 12 in the third region 10 is less than the content ratio of the binding phases 12 in the second region 7. This is because a content ratio of the hard phases 11 in the third region 10 can be enhanced because of a relatively small content ratio of the binding phases 12 in the third region 10 including the third surface 8.

(Manufacturing Method)

A method of manufacturing the cutting insert 1 in a non-limiting aspect of the disclosure is described below.

A mixed powder is prepared by adding and mixing together TiCN powder having a mean particle diameter of 0.1-1.2 μm, particularly, 0.3-0.9 μm, tungsten carbide (WC) powder having a mean particle diameter of 0.1-2.5 μm, at least one kind selected from carbide powder, nitride powder, and carbonitride powder of metals of Groups 4, 5, and 6 of the periodic table, except for titanium carbonitride (TiCN) and WC, a predetermined amount of metal cobalt powder and metal nickel powder having a mean particle diameter of 0.5-5 μm, 1-20% by mass of at least one of metal tungsten powder having a mean particle diameter of 3-15 μm and $WC_{1-x}$($0<x\leq1$) powder, and carbon powder if desired.

As the above-mentioned at least one kind selected from carbide powder, nitride powder, and carbonitride powder of metals of Groups 4, 5, and 6 of the periodic table, titanium nitride (TiN) powder, niobium carbide (NbC) powder, molybdenum carbide (MoC) powder, tantalum carbide (TaC) powder, vanadium carbide (VC) powder, and zirconium carbide (ZrC) powder having a mean particle diameter of 0.1-3 μm are employable in the present non-limiting aspect of the disclosure.

The mixed powder is prepared by adding, for example, a binder and a solvent to the above weighed raw material powders, and by mixing them together with a well-known mixing method, such as a ball mill, a vibration mill, a jet mill, and an attritor mill. The attritor mill is employed in the present non-limiting aspect of the disclosure.

Although the raw material powders have a smaller particle diameter by being crushed due to the powder mixing with the use of the attritor mill, the metal powders have high ductility and are therefore less likely to be crushed. A molded body is then prepared by molding the mixed powder into a predetermined shape with a well-known molding method, such as press molding, extrusion molding injection molding.

With the present non-limiting aspect of the disclosure, the molded body is sintered in vacuum or an inert gas atmosphere. With the present non-limiting aspect of the disclosure, the base member 2 composed of cermet having the above-mentioned predetermined structure can be manufactured by carrying out sintering under the following conditions. Specific sintering conditions includes: (a) increasing temperature from room temperature to 1100° C.; (b) increasing temperature from 1100° C. to a first sintering temperature of 1330-1380° C. in vacuum at a temperature rise rate of 0.1-2° C./min; (c) increasing temperature from the first sintering temperature to a second sintering temperature of 1500-1600° C. in vacuum or an inert gas atmosphere of 30-2000 Pa at a temperature rise rate of 4-15° C./min; (d) retaining the second sintering temperature for 0.5-2 hours in vacuum or an inert gas atmosphere of 30-2000 Pa; and decreasing temperature at a temperature drop rate of 5-15° C./min in a nitrogen gas atmosphere of 1000-5000 Pa.

Metal Co powder and metal Ni powder melt into each other while being solid-solved, and enter around the hard phases 11 so as to join the hard phases 11 together by adjusting a mean particle diameter of each of the WC powder and the metal W powder in the above raw material powders, and by controlling a temperature increase pattern and timing to introduce a predetermined amount of inert gas during the sintering.

At least one of the metal W powder and the $WC_{1-x}$ ($0<x\leq1$) powder which exist in a state of having a greater mean particle diameter than other raw material powders in the molded body diffuses partially into the hard phases 11 due to the sintering, while a part thereof forms the second binding phase 16. A predetermined residual stress is applicable to the first hard phases 13 and the second hard phases 14 by adjusting a cooling pattern.

In the present non-limiting aspect of the disclosure, a compressive residual stress applied to the first hard phases 13 is greater than a compressive residual stress applied to the second hard phases 14. The second hard phases 14 located in a surface of a sintered body have a greater compressive residual stress than the second hard phases 14 located inside the sintered body.

Subsequently, the surface of the obtained sintered body is subjected to a polishing process. Firstly, a blast process is applied to the first surface 3 of the sintered body. This makes it possible to enhance the compressive residual stress of the hard phases 11 in the rake surface region of the first surface 3. In the case of a negative insert having the first cutting edge 5 and the second cutting edge 9 as a cutting insert, the blast process is also applied to the third surface 8 located on opposite side of the first surface 3.

Subsequently, a grinding process using a grinding wheel is applied to the second surface 4 which is adjacent to the first surface 3 after being subjected to the blast process, and which has the flank surface region. Grinding wheels of *1000 to *8000 may be used, for example, in a non-limiting aspect of the disclosure. The second hard phases 14 which are located inside the sintered body and have a relatively small compressive residual stress are exposed to the surface of the second surface 4 by the grinding process. Thereafter, if desired, a blast process or brush process is applied to the first cutting edge 5, thereby applying a predetermined amount of honing to the first cutting edge 5.

A coating layer may be deposited on the surface of the base member 2 if desired. Physical vapor deposition (PVD) method, such as ion plating method and sputtering method, is suitably employable as a method of depositing the coating layer.

A cutting tool 101 in a non-limiting aspect of the disclosure is described below with reference to the drawings.

Figure 6:
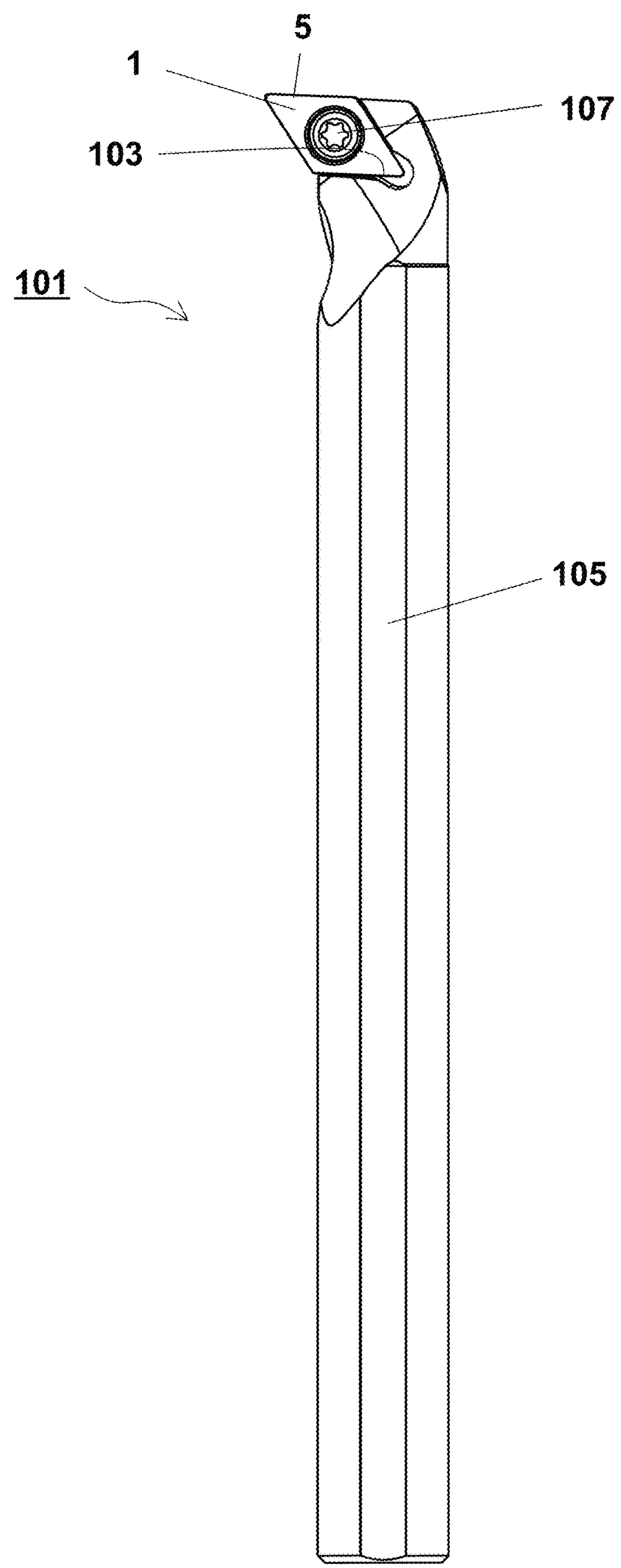
FIG. 6 is a top view illustrating a cutting tool.

As illustrated in FIG. 6, the cutting tool 101 of the present non-limiting aspect of the disclosure is a bar-shaped body extending from a first end (an upper end in FIG. 6) to a second end (a lower end in FIG. 6). The cutting tool 101 includes a holder 105 including a pocket 103 at a side of the first end, and the insert 1 located in the pocket 103.

The pocket 103 is a portion to which the insert 1 is attached. The pocket 103 includes a seating surface parallel to a lower surface of the holder 105, and a constraining side surface being inclined relative to the seating surface. The pocket 103 opens at a side of the first end of the holder 105.

The insert 1 is located in the pocket 103. The lower surface of the insert 1 may be directly contacted with the pocket 103. Alternatively, a sheet may be held between the insert 1 and the pocket 103.

The insert 1 is attached so that a part of the first ridge line which is used as the first cutting edge protrudes outward from the holder 105. The insert 1 is attached to the holder 105 by a fixing screw 107 in the present non-limiting aspect of the disclosure. Specifically, screw portions are screwed together by inserting the fixing screw 107 into a through hole of the insert 1, and by inserting a front end of the fixing screw 107 into a screw hole (not illustrated) formed in the pocket 103.

As a material of the holder 105, for example, steel or cast iron is usable. Of these materials, high rigidity steel may be used in a non-limiting aspect of the disclosure.

The present non-limiting aspect of the disclosure illustrate and describe the cutting tool used in a so-called turning process. Examples of the turning process include inner diameter machining, outer diameter machining, and grooving process. The cutting tool is not limited to ones which are usable in the turning processes. For example, the insert 1 of the foregoing non-limiting aspect of the disclosure may be applied to cutting tools usable in a milling process.

Example 1

A mixed powder was manufactured by preparing, on the basis of measurement with Microtrac method, an amount of 35% by mass of TiCN powder having a mean particle diameter of 0.6 μm, an amount of 15% by mass of WC powder having a mean particle diameter of 1.1 μm, an amount of 11% by mass of TiN powder having a mean particle diameter of 1.5 μm, an amount of 11% by mass of NbC powder having a mean particle diameter of 1.5 μm, an amount of 1% by mass of ZrC powder having a mean particle diameter of 1.8 μm, an amount of 1% by mass of VC powder having a mean particle diameter of 1 μm, an amount of 10% by mass of Ni powder having a mean particle diameter of 2.4 μm, an amount of 10% by mass of Co powder having a mean particle diameter of 1.9 μm, and an amount of 6% by mass of W powder having a mean particle diameter of 7 μm.

A slurry was manufactured by adding, to the mixed powder, isopropyl alcohol (IPA) and paraffin, as well as stainless ball mill and carbide balls, followed by mixing with an attritor mill. Granulated powder was manufactured by carrying out granulation by spray drying using the slurry. The granulated powder was press-molded at 150 MPa into a quadrangular plate shape.

Subsequently, sintering was carried out under the following sintering conditions: (a) increasing temperature from room temperature to 1100° C.; (b) increasing temperature at 0.7° C./min from 1100° C. to a first sintering temperature of 1350° C. in vacuum; (c) increasing temperature at 10° C./min from 1350° C. to a second sintering temperature of 1575° C. in an $N_2$ gas atmosphere of 1000 Pa; (d) retaining 1575° C. for 1 hour in the $N_2$ gas atmosphere of 1000 Pa; and (e) decreasing temperature at a temperature drop rate of 10° C./min in the $N_2$ gas atmosphere of pressure 3000 Pa. Each of inserts was obtained by applying processing presented in Table 1 to the first surface and the second surface.

Compositions of the metal elements contained in the base member in each of the obtained inserts by ICP analysis, and a content of each of the metal elements to a total amount of the metal elements was calculated. Using a cermet, whose carbon content was known, as a standard sample, a carbon content and a nitrogen content in a center side portion of the base member, which was obtained by polishing 500 μm or more from the surface of the base member, were measured by a carbon analyzer.

The composition of the cermet was as follows: Ti was 37.7% by mass, W was 24.3% by mass, Nb was 11.8% by mass, Zr was 1.1% by mass, V was 1% by mass, Co was 12.1% by mass, and Ni was 12.1% by mass, relative to the total amount of the metals. The carbon content was 6.15% by mass and the nitrogen content was 6.43% by mass relative to a total amount of the cermet.

Structures at five arbitrary portions were checked by observation through a Transmission Electron Microscope (TEM), and types of the hard phases and the binding phases were identified on a 50000-power photograph by an Electron Probe Micro Analyzer (EPMA), thereby determining the presence or absence of the first hard phase, the second hard phase, the first binding phase, and the second binding phase. It was found that a cored structure phase existed at a proportion of 10% by area or less with respect to the entirety of the hard phases in each of samples.

An image analysis of a region of 2500 nm×2000 nm was performed using commercially available image analysis software. As a result, an area ratio B1 of the first binding phase was 20% by area, an area ratio B2 of the second binding phase was 9% by area, an area ratio of other binding phases was 2% by area, and a ratio B2/B1 was 0.45. An area ratio of a sum of B1 and B2 with respect to the entirety of the binding phases was 0.94.

A mean particle diameter (d1) of the first hard phase was 0.43 μm, a mean particle diameter (d2) of the second hard phase was 1.8 μm, and a ratio thereof d2/d1 was 4.19. An area ratio S1 of the first hard phase was 25% by area and an area ratio S2 of the second hard phase was 44% by area within a field of view.

Additionally, a maximum height of each of the first surface, the second surface, and the first ridge line, and an arithmetic mean roughness were measured. Compressive residual stresses of the first hard phase and the second hard phase in each of the first surface and the second surface were measured by 2D method. The compressive residual stresses were indicated by positive values in Table 1. The surface of the base member including each of the first surface and the second surface was observed through the Scanning Electron Microscope (SEM), and distribution states of the metal elements were checked by the EPMA. The presence or absence of the first region having a lower content ratio of the binding phase than the second region was determined, and a thickness of the first region was measured. The results were presented in Table 1.

A turning test using each of the obtained inserts was carried out under the following cutting conditions. The results were presented in Table 2.

(Evaluation of Finished Surface)

Workpiece: S10C

Cutting speed: 50 m/min

Feed rate: 0.07 mm/rev

Depth of Cut: 0.5 mm

Cutting state: wet

Evaluation method: An arithmetic mean roughness and a degree of darkness of a machined surface of the workpiece were determined after machining for 30 seconds.

(Lifetime Evaluation)

Workpiece: SCM435

Cutting speed: 250 m/min

Feed rate: 0.12 mm/rev

Depth of Cut: 0.5 mm

Cutting state: wet

Evaluation method: An amount of crater wear after cutting out 100 m, and a cut-out length until reaching lifetime were measured.

TABLE 1

| Sample No. | Process condition: First surface | Process condition: Second surface | | Thickness of first region (μm) | First surface $\sigma_{11}$(MPa): First hard phase | First surface $\sigma_{11}$(MPa): Second hard phase | Second surface $\sigma_{11}$(MPa): First hard phase | Second surface $\sigma_{11}$(MPa): Second hard phase |
|---|---|---|---|---|---|---|---|---|
| 1 | Blast | Grind | Brush | 60 | 80 | 850 | 100 | 370 |
| 2 | Blast | Grind | | 70 | 115 | 680 | 120 | 300 |
| 3 | Blast | Grind | Blast | 50 | 130 | 570 | 60 | 150 |
| 4 | None | Grind | Brush | 70 | 0 | 250 | 30 | 300 |
| 5 | Blast | Blast | | 60 | 120 | 580 | 150 | 580 |

TABLE 2

| Sample No. | Maximum height (μm): First surface | Maximum height (μm): Second surface | Maximum height (μm): Cutting edge | Maximum height (μm): Cutting edge/Second surface | Arithmetic mean roughness (μm): First surface | Arithmetic mean roughness (μm): Second surface | Machined surface: Surface roughness (μm) | Machined surface: Degree of darkness | Cut-out length (m) | Depth of crater wear (μm) |
|---|---|---|---|---|---|---|---|---|---|---|
| 1 | 1 | 0.3 | 2.8 | 9.33 | 0.17 | 0.06 | 1.5 | None | 14.4 | 38 |
| 2 | 0.4 | 0.4 | 4.8 | 12 | 0.12 | 0.03 | 1.7 | None | 13.1 | 42 |
| 3 | 1.3 | 0.5 | 3.4 | 6.8 | 0 15 | 0.08 | 1.8 | None | 11.5 | 40 |
| 4 | 0.7 | 0.4 | 3 | 7.5 | 0.22 | 0.05 | 3.1 | Present | 7.2 | 50 |
| 5 | 1.2 | 0.5 | 5 | 10 | 0.18 | 0.1 | 4.3 | Present | 9.6 | 45 |

Tables 1 and 2 show the following. In each of Samples Nos. 1 to 3, in which a compressive residual stress of the second hard phase in the second surface was less than a compressive residual stress of the second hard phase in the first surface, surface roughness of the machined surface was smooth and no darkness of the machined surface was observed. Each of Samples Nos. 1 to 3 had less crater wear in the first surface and achieved a great cut-out length.

Description of the Reference Numerals

1 cutting insert (insert)
2 base member
3 first surface
4 second surface
5 first cutting edge
6 first region
7 second region
8 third surface
9 second cutting edge
10 third region
11 hard phase
12 binding phase
13 first hard phase
14 second hard phase
15 first binding phase
16 second binding phase
101 cutting tool
103 pocket
105 holder
107 fixing screw

What is claimed is:

1. A cutting insert, comprising:

a base member comprising a first surface as a rake surface, a second surface as a flank surface adjacent to the first surface, and a first cutting edge located in at least a part of a first ridge line which the first surface intersects with the second surface, wherein the base member comprises a hard phase containing a titanium carbonitride, and a binding phase comprising tungsten and at least one of cobalt and nickel;

the binding phase comprises a first binding phase and a second binding phase, in which, the first binding phase has a mass ratio of tungsten to a total amount of cobalt and nickel (W/(Co+Ni)) that is 0.8 or less, and, the second binding phase has a mass ratio of tungsten to a total amount of cobalt and nickel (W/(Co+Ni)) that is 1.2 or more;

the hard phase comprises a first hard phase observed on a higher angle side, and a second hard phase observed on a lower angle side in a comparison of (422) plane peak in an X-ray diffraction analysis; and a compressive residual stress of the second hard phase in the second surface is less than a compressive residual stress of the second hard phase in the first surface.

2. The cutting insert according to claim 1, wherein the base member comprises a first region comprising the first surface, and a second region located further away from the first surface than the first region, and a content ratio of the binding phase in the first region is less than a content ratio of the binding phase in the second region.

3. The cutting insert according to claim 2, wherein the second surface comprises the second region, and a content ratio of the binding phase of the second region in the second surface is less than a content ratio of the binding phase at a position in the second region which is located at a depth of 500 μm or more from the second surface.

4. The cutting insert according to claim 2, wherein a compressive residual stress of the second hard phase in the second region is less than a compressive residual stress of the second hard phase in the first region.

5. The cutting insert according to claim 2, wherein a thickness of the first region in a direction orthogonal to the first surface in a part along the first cutting edge is less than a thickness of the first region in a direction orthogonal to the first surface in a middle part of the first surface.

6. The cutting insert according to claim 2, wherein the base member further comprises a third surface located opposite the first surface and adjacent to the second surface, and a second cutting edge located in at least a part of a second ridge line which the third surface intersects with the second surface, the base member comprises a third region comprising the third surface, and a content ratio of the binding phase in the third region is less than the content ratio of the binding phase in the second region.

7. The cutting insert according to claim 1, wherein a compressive residual stress of the first hard phase in the second surface is greater than a compressive residual stress of the first hard phase in the first surface.

8. The cutting insert according to claim 1, wherein a maximum height of the first surface is 0.3-1.5 μm, a maximum height of the second surface is 0.2-1 μm, and a maximum height of the first ridge line in a front view of the second surface is 1.5-6 μm.

9. The cutting insert according to claim 1, wherein the compressive residual stress of the second hard phase in the second surface is 10-400 MPa.

10. The cutting insert according to claim 1, wherein the compressive residual stress of the second hard phase in the first surface is 450-1000 MPa.

11. A cutting tool, comprising:

a holder comprising a pocket at a side of a front end of the holder; and the cutting insert according to claim 1, the cutting insert located in the pocket.

12. A cutting insert, comprising:

a base member comprising a first surface as a rake surface, a second surface as a flank surface adjacent to the first surface, and a first cutting edge located in at least a part of a first ridge line which the first surface intersects with the second surface, wherein the base member comprises a hard phase containing a titanium carbonitride, and a binding phase comprising tungsten and at least one of cobalt and nickel;

the hard phase comprises a first hard phase observed on a higher angle side, and a second hard phase observed on a lower angle side in a comparison of (422) plane peak in an X-ray diffraction analysis;

a compressive residual stress of the second hard phase in the second surface is less than a compressive residual stress of the second hard phase in the first surface; and a compressive residual stress of the first hard phase in the second surface is greater than a compressive residual stress of the first hard phase in the first surface.

13. The cutting insert according to claim 12, wherein the base member comprises a first region comprising the first surface, and a second region located further away from the first surface than the first region, and a content ratio of the binding phase in the first region is less than a content ratio of the binding phase in the second region.

14. The cutting insert according to claim 13, wherein the second surface comprises the second region, and a content ratio of the binding phase of the second region in the second surface is less than a content ratio of the binding phase at a position in the second region which is located at a depth of 500 μm or more from the second surface.

15. The cutting insert according to claim 13, wherein a compressive residual stress of the second hard phase in the second region is less than a compressive residual stress of the second hard phase in the first region.

16. The cutting insert according to claim 13, wherein a thickness of the first region in a direction orthogonal to the first surface in a part along the first cutting edge is less than a thickness of the first region in a direction orthogonal to the first surface in a middle part of the first surface.

17. The cutting insert according to claim 13, wherein the base member further comprises a third surface located opposite the first surface and adjacent to the second surface, and a second cutting edge located in at least a part of a second ridge line which the third surface intersects with the second surface, the base member comprises a third region comprising the third surface, and a content ratio of the binding phase in the third region is less than the content ratio of the binding phase in the second region.

18. The cutting insert according to claim 12, wherein a maximum height of the first surface is 0.3-1.5 μm, a maximum height of the second surface is 0.2-1 μm, and a maximum height of the first ridge line in a front view of the second surface is 1.5-6 μm.

19. The cutting insert according to claim 12, wherein the compressive residual stress of the second hard phase in the second surface is 10-400 MPa and the compressive residual stress of the second hard phase in the first surface is 450-1000 MPa.

20. A cutting tool, comprising:

a holder comprising a pocket at a side of a front end of the holder; and the cutting insert according to claim 12, the cutting insert located in the pocket.

* * * * *

UNITED STATES PATENT AND TRADEMARK OFFICE

CERTIFICATE OF CORRECTION

PATENT NO. : 11,794,257 B2
APPLICATION NO. : 16/093154
DATED : October 24, 2023
INVENTOR(S) : Hideyoshi Kinoshita et al.

It is certified that error appears in the above-identified patent and that said Letters Patent is hereby corrected as shown below:

In the Specification

In Column 3, Line 61 please change "a value of 219" to -- a value of 2θ --

In Column 6, Line 39 please change "a thickness is" to -- a thickness ts --

Signed and Sealed this
Nineteenth Day of December, 2023

Katherine Kelly Vidal

Katherine Kelly Vidal
*Director of the United States Patent and Trademark Office*